United States Patent
Chou et al.

(10) Patent No.: US 10,591,896 B2
(45) Date of Patent: Mar. 17, 2020

(54) 3D PRINTING DATA GENERATING METHOD AND ELECTRONIC DEVICE USING THE SAME

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Ching-Yuan Chou, New Taipei (TW); Ting-Yu Lu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 755 days.

(21) Appl. No.: 14/846,998

(22) Filed: Sep. 7, 2015

(65) Prior Publication Data
US 2016/0347004 A1   Dec. 1, 2016

(30) Foreign Application Priority Data
May 25, 2015   (CN) .......................... 2015 1 0270209

(51) Int. Cl.
*G05B 19/4099* (2006.01)
*H04N 1/387* (2006.01)
(Continued)

(52) U.S. Cl.
CPC .......... *G05B 19/4099* (2013.01); *B29C 64/20* (2017.08); *B33Y 40/00* (2014.12);
(Continued)

(58) Field of Classification Search
None
See application file for complete search history.

(56) References Cited

U.S. PATENT DOCUMENTS

2009/0051977 A1* 2/2009 Moody ................... G06T 11/60
358/450
2009/0262394 A1* 10/2009 Adachi ................. G06F 3/1208
358/1.15
(Continued)

FOREIGN PATENT DOCUMENTS

CN          103037154          4/2013
CN          103679640          3/2014
(Continued)

OTHER PUBLICATIONS

"Office Action of China Counterpart Application", dated Nov. 2, 2018, p. 1-p. 8.
(Continued)

*Primary Examiner* — J. H. Hur
(74) *Attorney, Agent, or Firm* — JCIPRNET

(57) ABSTRACT

The disclosure provides a printing layer trimming method and an electronic device using the same. The printing layer trimming method is suitable for the electronic device and includes steps as follows. An original layer is converted into a first printing layer. At least one data region of the first printing layer is identified to identify at least one blank region of the first printing layer. Then, the blank region of the first printing layer is trimmed off The trimmed first printing layer is further converted into a print head signal data and provided to a printing device to print a corresponding three-dimensional structure. The disclosure also provides another printing layer trimming method and an electronic device using the same for trimming a second printing layer generated according to a print head signal data and providing the second printing layer to a printing device to print a corresponding three-dimensional structure.

3 Claims, 6 Drawing Sheets

(51) Int. Cl.
*B33Y 40/00* (2020.01)
*B29C 64/20* (2017.01)
(52) U.S. Cl.
CPC . *H04N 1/3873* (2013.01); *G05B 2219/35134* (2013.01); *G05B 2219/49007* (2013.01)

(56) References Cited

U.S. PATENT DOCUMENTS

| | | |
|---|---|---|
| 2013/0075013 A1 | 3/2013 | Chillscyzn et al. |
| 2013/0075954 A1 | 3/2013 | Gregory, II et al. |
| 2013/0076942 A1 | 3/2013 | Azuma |
| 2013/0138234 A1* | 5/2013 | Dufort .................... G06T 19/00 700/98 |

FOREIGN PATENT DOCUMENTS

| | | |
|---|---|---|
| CN | 104011593 | 8/2014 |
| CN | 203811991 | 9/2014 |
| GB | 2422344 | 7/2006 |
| GB | 2422344 | 8/2008 |
| WO | 2009026069 | 2/2009 |
| WO | 2014044017 | 3/2014 |

OTHER PUBLICATIONS

"Office Action of Europe Counterpart Application", dated Oct. 30, 2019, p. 1-p. 7.

* cited by examiner

3D PRINTING DATA GENERATING METHOD AND ELECTRONIC DEVICE USING THE SAME

CROSS-REFERENCE TO RELATED APPLICATION

This application claims the priority benefit of China patent application serial no 201510270209.4, filed on May 25, 2015. The entirety of the above-mentioned patent application is hereby incorporated by reference herein and made a part of the specification.

BACKGROUND

1. Technical Field

The disclosure relates to a trimming method, and particularly relates to a printing layer trimming method and an electronic device using the same.

2. Description of Related Art

Through the recent development of science and technology, a variety of methods using the additive manufacturing technology to construct a physical three-dimensional structure or a physical three-dimensional model have been proposed. The three-dimensional structure or three-dimensional model is also known as 3D structure or 3D model. Generally speaking, the additive manufacturing technology serves to convert design data of a three-dimensional structure or a three-dimensional model constructed using software such as computer aided design (CAD) into a plurality of two-dimensional layers that are continuously stacked. The two-dimensional layers are further converted into print head data that are readable for a printing device. Besides, the printing device receives the print head data, and move along an XY plane above a base in a spatial coordinate system XYZ constructed according to the design data of the three-dimensional structure or three-dimensional model, so as to form a layer in a correct shape by using a construction material.

Generally speaking, the number of the two-dimensional layers may change in accordance with a size of the three-dimensional structure or the three-dimensional model. Thus, as the three-dimensional structure or the three-dimensional model becomes bigger, the number of the corresponding two-dimensional layers also increases. However, the large number of the two-dimensional layers may result in difficulties in transmission and storage. Thus, the printing time and/or the hardware cost may correspondingly increase. Thus, how to reduce the time consumed for transmitting a large number of the two-dimensional layers and avoid spending too much storage space on storing the two-dimensional layers should be the issues that people having ordinary skills in the art should work on.

SUMMARY

A printing layer trimming method and an electronic device using the same provided in the disclosure are able to effectively reduce an image file size of a printing layer, thereby improving a transmission efficiency of the printing layer and a print head signal data and reducing a storage space of the printing layer and the print head signal data.

An embodiment of the disclosure provides a printing layer trimming method suitable for an electronic device. The printing layer trimming method includes steps as follows. An original layer is converted into a first printing layer. The original layer is one of a plurality of layers corresponding to a three-dimensional structure. At least one data region of the first printing layer is identified to identify at least one blank region of the first printing layer. Then, the blank region of the first printing layer is trimmed off.

Another embodiment of the disclosure provides a printing layer trimming method suitable for an electronic device. The printing layer trimming method includes steps as follows. An original layer is converted into a first printing layer. The original layer is one of a plurality of layers corresponding to a three-dimensional structure. A first printing layer is formatted into a print head signal data, and then a second printing layer is generated according to the print head signal data. At least one data region of the second printing layer is identified to identify at least one blank region of the second printing layer. Then, the blank region of the second printing layer is trimmed off.

An embodiment of the disclosure provides an electronic device. The electronic device includes a converting unit, an identifying unit, and a trimming unit. The converting unit converts an original layer into a first printing layer. The original layer is one of a plurality of layers corresponding to a three-dimensional structure. The identifying unit is coupled to the converting unit, identifies at least one data region of the first printing layer to identify at least one blank region of the first printing layer. The trimming unit is coupled to the converting unit and the identifying unit and trims off the blank region of the first printing layer.

Another embodiment of the disclosure provides an electronic device. The electronic device includes a converting unit, an identifying unit, and a trimming unit. The converting unit converts an original layer into a first printing layer and formats the first printing layer into a print head signal data. Then, a second printing layer is generated according to the print head signal data. The original layer is one of a plurality of layers corresponding to a three-dimensional structure. The identifying unit is coupled to the converting unit, identifies at least one data region of the second printing layer to identify at least one blank region of the second printing layer. The trimming unit is coupled to the converting unit and the identifying unit and trims off the blank region of the second printing layer.

Based on above, the printing layer trimming method and the electronic device using the same provided in the embodiments of the disclosure reduce the size of a first printing layer by trimming off a blank region of the first printing layer. The trimmed first printing layer may be converted into the print head signal data and then compressed to provide a preferable effect of compression. Also the printing layer trimming method and the electronic device using the same according to another embodiment of the disclosure may trim a second printing layer after the second printing layer is converted from a print head data signal. Thus, no matter the first printing layer, the second printing layer, or the print head signal data is stored, the consumed storage space may be significantly reduced, and a transmission efficiency of the print head signal data or the second layer may also be improved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
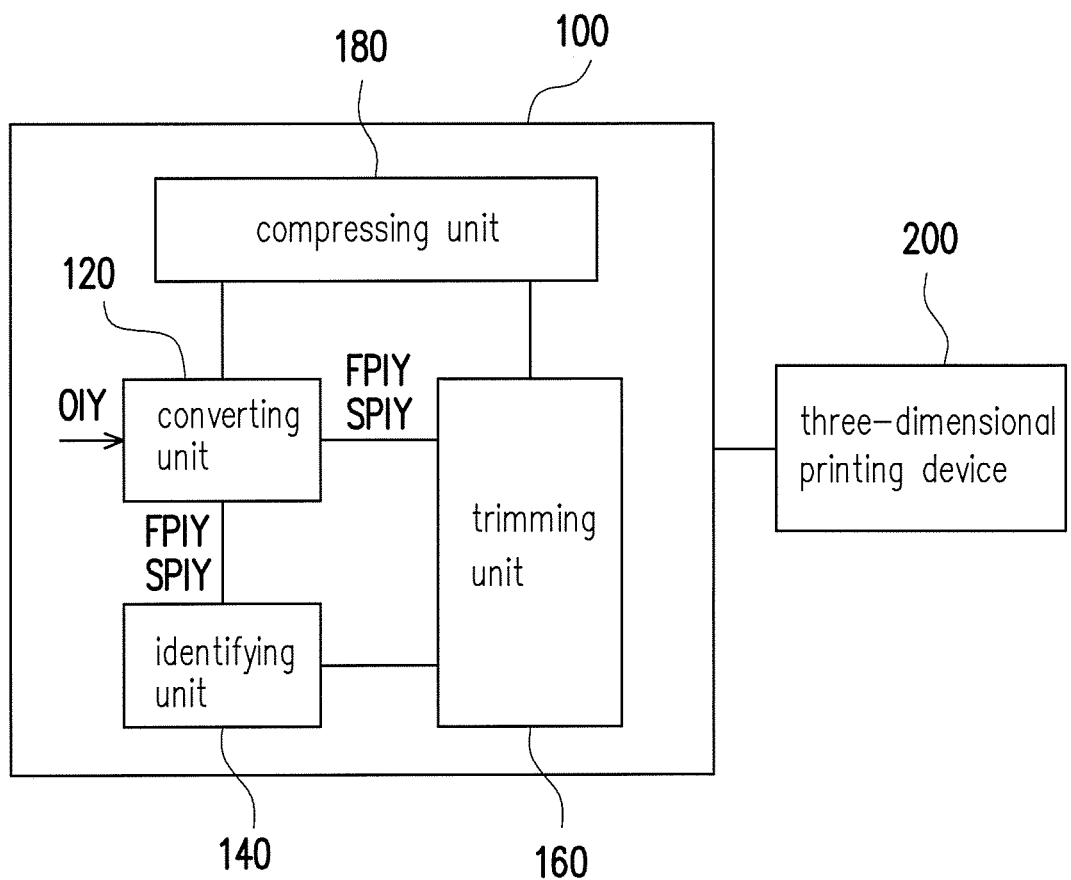
FIG. 1 is a structural schematic view illustrating an electronic device according to an embodiment of the disclosure.

Reference will now be made in detail to the embodiments of the disclosure, examples of which are illustrated in the accompanying drawings. Wherever possible, the same reference numbers are used in the drawings and the description to refer to the same or like parts.

Generally speaking, a three-dimensional structure constructed by using software such as computer aided design (CAD) is stored in a standard tessellation language (STL) format, for example. A plurality of two-dimensional original layers that are continuously stacked may be generated from the three-dimensional layer through a cutting process, and the original layer corresponds to a cross-section of the three-dimensional structure. The original layer is a vector layer, and is in a scalable vector graphics (SVG) format, for example. In general, the original layer may be further converted into a first printing layer, and the first printing layer is usually a bitmap image layer, such as a layer in a bitmap picture (BMP) format, and may be formatted into a print head signal data that is readable by a printing device. After receiving the print head signal data, starting from the bottommost printing layer, the printing device forms a layer in a correct shape on a base according to each of the printing layers, so as to print the three-dimensional structure. The print head signal data in a specific format may be converted into a second printing layer, and the second printing layer is also a bitmap layer, such as a layer in a portable bitmap (PBM) format. A part of the printing device may receive the second printing layer to print the three-dimensional structure. It should be noted that, each original layer, first printing layer, and second printing layer may have the same resolution or range according to the base.

It can also be understood that, as a size of the three-dimensional structure becomes bigger, the number of printing layers becomes bigger as well. To reduce a storage space required for the first printing layer, the second printing layer, or the print head signal data and increase a transmission efficiency of the second printing layer or the print head signal data, embodiments of the disclosure provide a printing layer trimming method and an electronic device using the same. FIG. 1 is a structural schematic view illustrating an electronic device according to an embodiment of the disclosure. Referring to FIG. 1, in this embodiment, an electronic device 100 includes a converting unit 120, an identifying unit 140, a trimming unit 160, and a compressing unit 180. In addition, the electronic device 100 is coupled to a three-dimensional printing device 200, for example.

To be more specific, the electronic device 100 is a device having a computing function, such as a computer device (e.g., a laptop computer, a tablet computer, or a desktop computer). However, the disclosure does not intend to impose a limitation on the type of the computer device 100. In other embodiments of the disclosure, the electronic device 100 may also be an electronic device that integrates the computing function and the three-dimensional printing function, for example. In the disclosure, the converting unit 120, the identifying unit 140, the trimming unit 160, and the compressing unit 180 may be respectively implemented as physical circuits or implemented by using a processor to execute corresponding programs. The processor (not shown) may be a central processing unit (CPU), programmable general-purpose or specific-purpose microprocessor, other similar devices, or a combination of the aforesaid devices, for example.

It should be noted that, in this embodiment, the electronic device 100 further includes components such as a transmitting unit (not shown) and a storage unit (not shown), etc. The transmitting unit is a transmitting unit compatible with the Universal Serial Bus (USB) transmission standard, for example, and the storage unit may be a hard disk drive (HDD) of any type, a random access memory (RAM), a read-only memory (ROM), a flash memory, other similar components, or a combination of the aforesaid components, for example.

Figure 2:
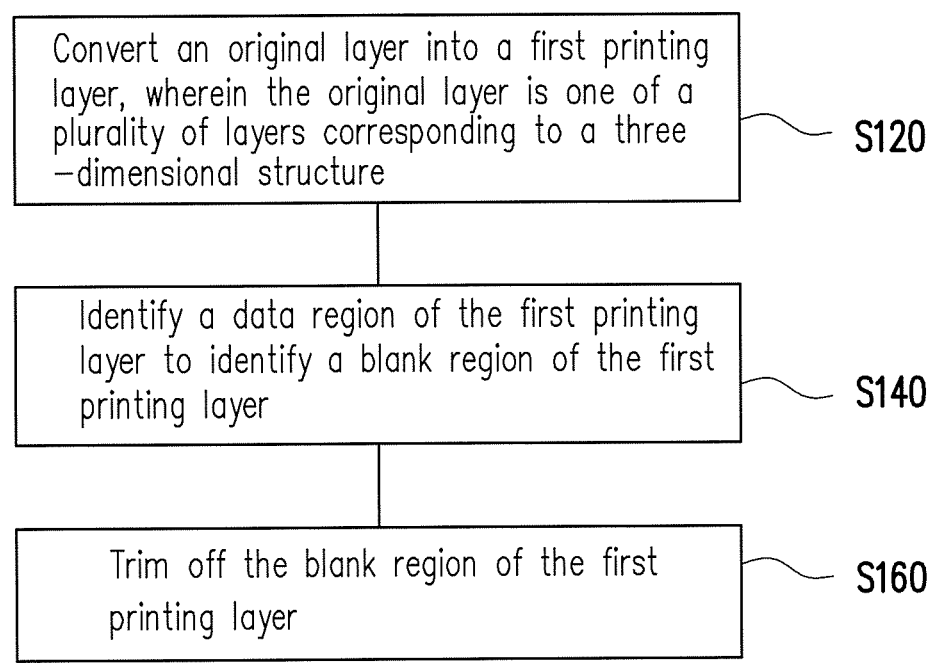
FIG. 2 is a flowchart illustrating a printing layer trimming method according to an embodiment of the disclosure.

FIG. 2 is a flowchart illustrating a printing layer trimming method according to an embodiment of the disclosure. The printing layer trimming method shown in FIG. 2 is suitable for the electronic device 100 of FIG. 1. However, the disclosure is not limited thereto. Referring to FIGS. 1 and 2, at first, the converting unit 120 of the electronic device 100 converts an original layer OIY into a printing layer FPIY after receiving the original layer OIY. The original layer OIY is one of the layers corresponding to the three-dimensional structure (Step S120). In this embodiment, the converting unit 120 simply converts the original layer OIY as a vector layer into a printing layer FPIY as a bitmap layer, for example, and the printing layer FPIY is in the BMP format. The identifying unit 140 is coupled to the converting unit 120 to receive the printing layer FPIY, and identifies a data region of the printing layer FPIY to identify a blank region of the printing layer FPIY (Step S140). More specifically, in this embodiment, the identifying unit 140 identifies and records a position information of the data region on the printing layer FPIY for the electronic device 100 to identify the blank region in the printing layer FPIY.

Figure 3:
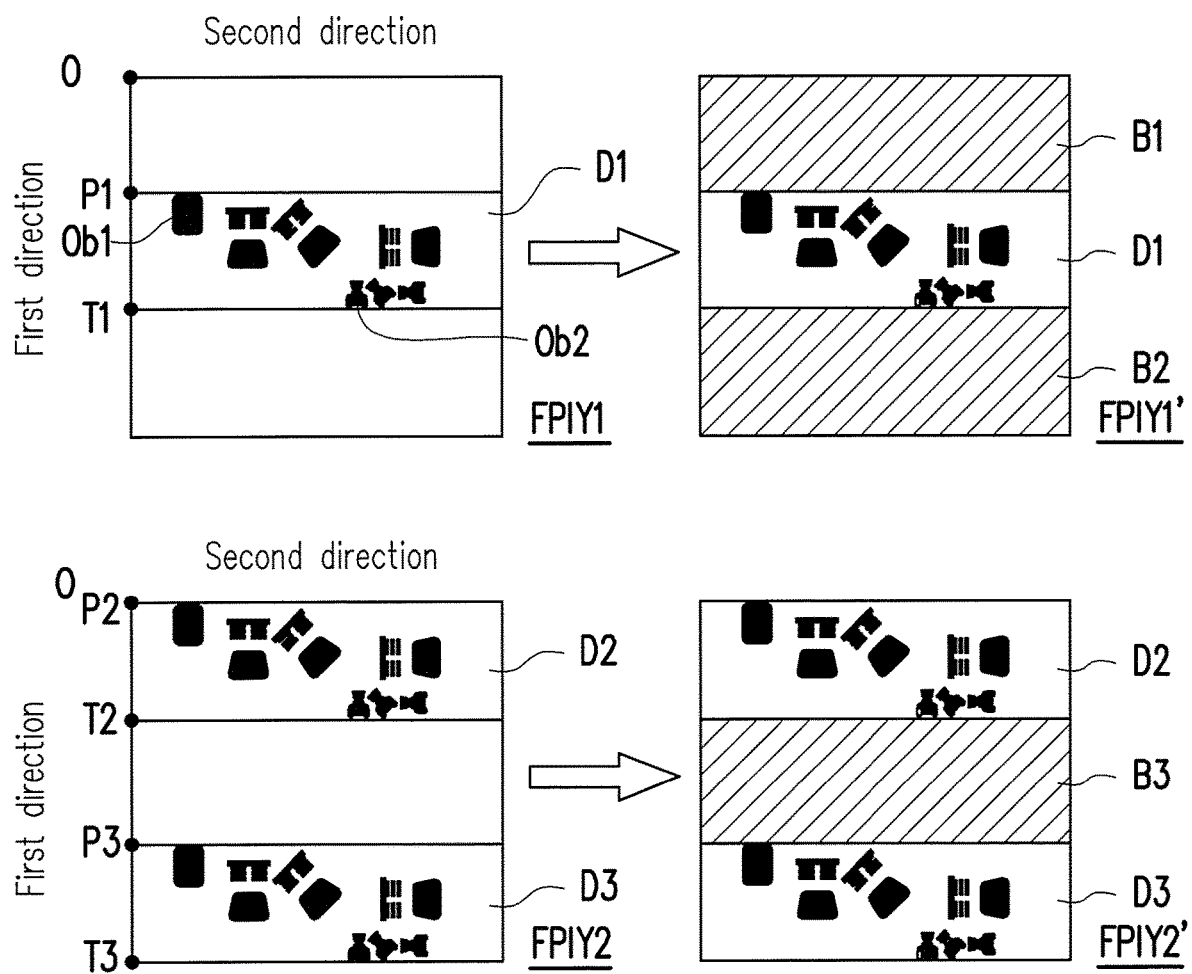
FIG. 3 is a schematic view illustrating identifying a blank region according to an embodiment of the disclosure.

FIG. 3 is a schematic view illustrating identifying a blank region according to an embodiment of the disclosure. Referring to FIG. 3, a printing layer FPIY1 corresponds to one of a plurality of layers of a three-dimensional structure, and the printing layer FPIY1 includes a plurality of substantive printing points (dark parts in the printing layers FPIY1 and FPIY2), and the substantive printing points may form a plurality of substantive printing portions (e.g., substantive printing portions Ob1 and Ob2) as shown in FIG. 3. Specifically, the substantive printing points indicate positions where the three-dimensional structure is present in the cross-sectional layer.

In a virtual coordinate system (with an origin point O) corresponding to the printing layers FPIY1 and FPIY2, the identifying unit 140 detects along a first direction from the origin point O, and may find a plurality of substantive printing points. Taking the printing layer FPIY1 for example, the substantive printing points start to appear at a coordinate point P1 in the first direction, and there is no more substantive printing point after a coordinate point T1 in the first direction. At this time, the identifying unit 140 considers the coordinate point P1 in the first direction as a first starting point position P1, and considers the coordinate point T1 in the first direction as a first end point position T1, thereby identifying a range of a data region D1. After obtaining the first starting point position P1 and the first end point position T1 of the data region D1, the identifying unit 140 may further identify a plurality of blank regions B1 and B2 of the printing layer FPIY1. In other words, the identifying unit 140 firstly identifies the first starting point position P1 and the first end point position T1 of the data region D1 in the first direction, and then identifies the blank regions B1 and B2 of the printing layer FPIY1 according to the first starting point position P1 and the first end point position T1 of the data region D1.

Similarly, taking the printing layer FPIY2 shown in FIG. 3 as an example, the identifying unit 140 detects the substantive printing points along the first direction from the origin point O. For the printing layer FPIY2, the substantive printing points start to appear at a coordinate point P2 in the first direction, and there is no more substantive printing point after a coordinate point T3 in the first direction. In addition, there is no printing point between a coordinate point T2 and a coordinate point P3 in the first direction. At this time, the identifying unit 140 may identify ranges of data regions D2 and D3 by using the coordinate points P2, T2, P3, and T3. More specifically, the identifying unit 140 considers the coordinate point P2 in the first direction as a first starting point position P2 of the data region D2 in the first direction and considers the coordinate point T2 in the first direction as a first end point position T2 of the data region D2 in the first direction. Similarly, the identifying unit 140 considers the coordinate point P3 in the first direction as a first starting point position P3 of the data region D3 in the first direction, and considers the coordinate point T3 in the first direction as a first end point position T3 of the data region D3 in the first direction. After confirming the data regions D2 and D3, the identifying unit 140 may identify a blank region B3 of the printing layer FPIY2.

In this embodiment, after identifying the first starting point positions P1, P2, and P3 and the first end point positions T1, T2, and T3 of the relevant data regions D1, D2, and D3, the identifying unit 140 treats the first starting point positions P1, P2, and P3 and the first end point positions T1, T2, and T3 as position information of the data regions D1, D2, and D3 on the printing layers FPIY1 and FPIY2 and transmits the position information to the trimming unit 160, so that the trimming unit 160 may trim off the blank regions B1, B2, and B3 of the printing layers FPIY1 and FPIY2. In an embodiment of the disclosure, the identifying unit 140 may further store the position information of the data regions D1, D2, and D3 on the printing layers FPIY1 and FPIY2 to the storage unit.

Figure 4:
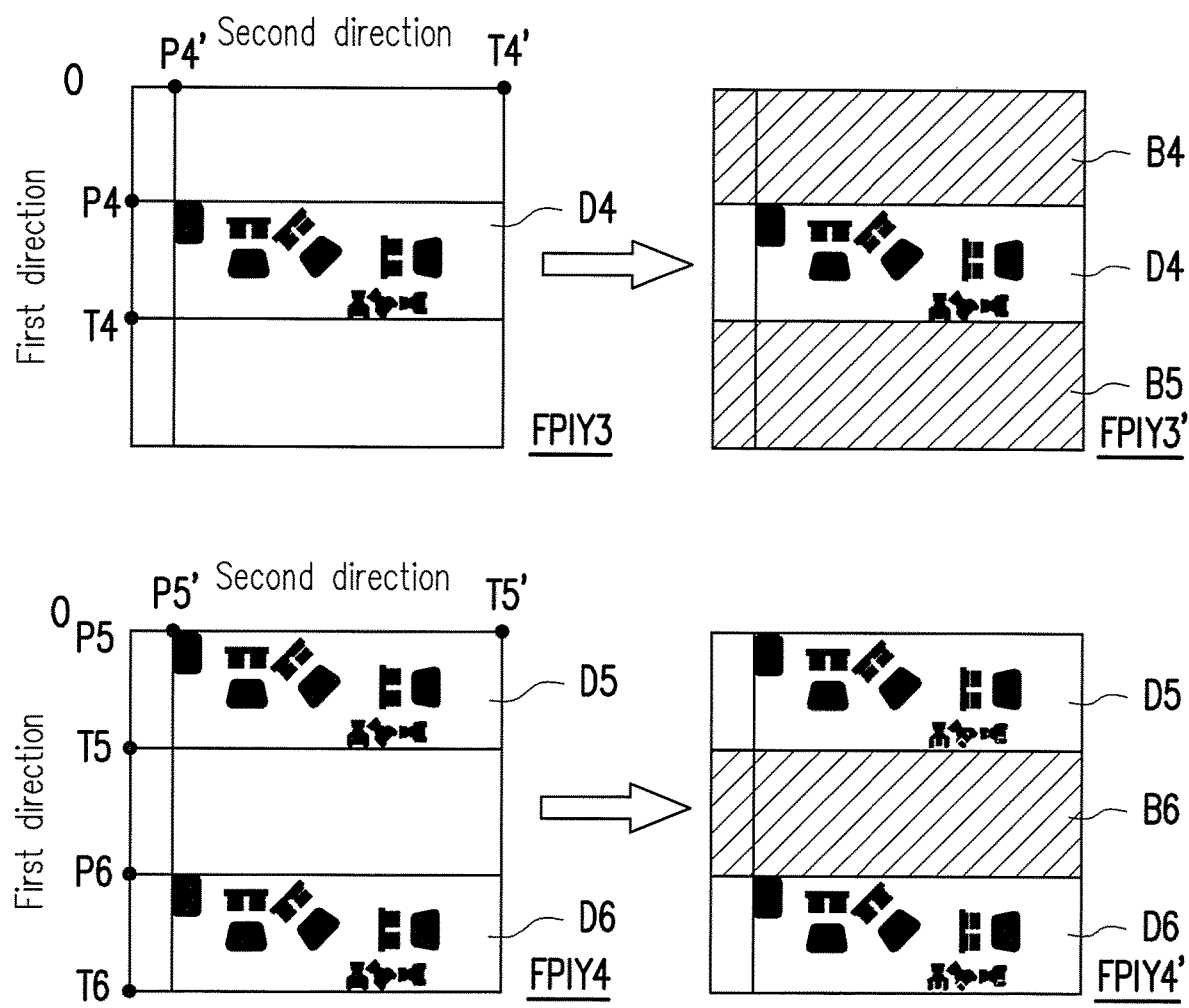
FIG. 4 is a schematic view illustrating identifying a blank region according to another embodiment of the disclosure.

FIG. 4 is a schematic view illustrating identifying a blank region according to an embodiment of the disclosure. Referring to FIG. 4, in this embodiment, the same virtual coordinate system (with the origin point O) is used for printing layers FPIY3 and FPIY4, and the identifying unit 140 may inspect the substantive printing points (dark parts of the printing layers FPIY3 and FPIY4) along a second direction from the origin point O.

Taking the printing layer FPIY3 as an example, the substantive printing points appear between coordinate points P4' and T4' in the second direction. Besides, in terms of the first direction, the substantive printing points appear between coordinate points P4 and T4 in the first direction. Here, the identifying unit 140 considers the coordinate points P4 and T4 in the first direction as a first starting point position P4 and a first end point position T4 and considers coordinate points P4' and T4' in the second direction as a second starting point position P4' and a second end point position T4', thereby confirming a range of a data region D4. After identifying the first starting point position P4, the first end point position T4, the second starting point position P4', and the second end point position T4', the identifying unit 140 may identify blank regions B4 and B5 of the printing layer FPIY3.

Similarly, taking the printing layer FPIY4 shown in FIG. 4 as an example, the substantive printing points appear between coordinate points P5' and T5' in the second direction. Besides, in terms of the first direction, the substantive printing points appear between coordinate points P5 and T5 in the first direction and coordinate points P6 and T6 in the first direction. Here, the identifying unit 140 respectively considers the coordinate points P5, P6, T5, and T6 in the first direction as first starting point positions P5 and P6 and first end point positions T5 and T6 and considers coordinate points P5' and T5' in the second direction as a second starting point position P5' and a second end point position T5', thereby continuing ranges of data regions D5 and D6. After identifying the first starting point positions P5 and P6, the first end point positions T5 and T6, the second starting point position P5', and the second end point position T6', the identifying unit 140 may identify a blank region B6 of the printing layer FPIY4.

The identifying unit 140 treats the first starting point positions P4, P5, and P6, the first end point positions T4, T5, and T6, the second starting point positions P4' and P5', and the second end point positions T4' and T5' as position information of the data regions D4, D5, and D6 on the printing layers FPIY3 and FPIY4 and transmits the position information to the trimming unit 160, so that the trimming unit 160 may trim off the blank regions B4, B5, and B6 of the printing layers FPIY3 and FPIY4. In an embodiment of the disclosure, the identifying unit 140 may store the position information of the data regions D4, D5, and D6 on the printing layers FPIY3 and FPIY4 to the storage unit.

Figure 5:
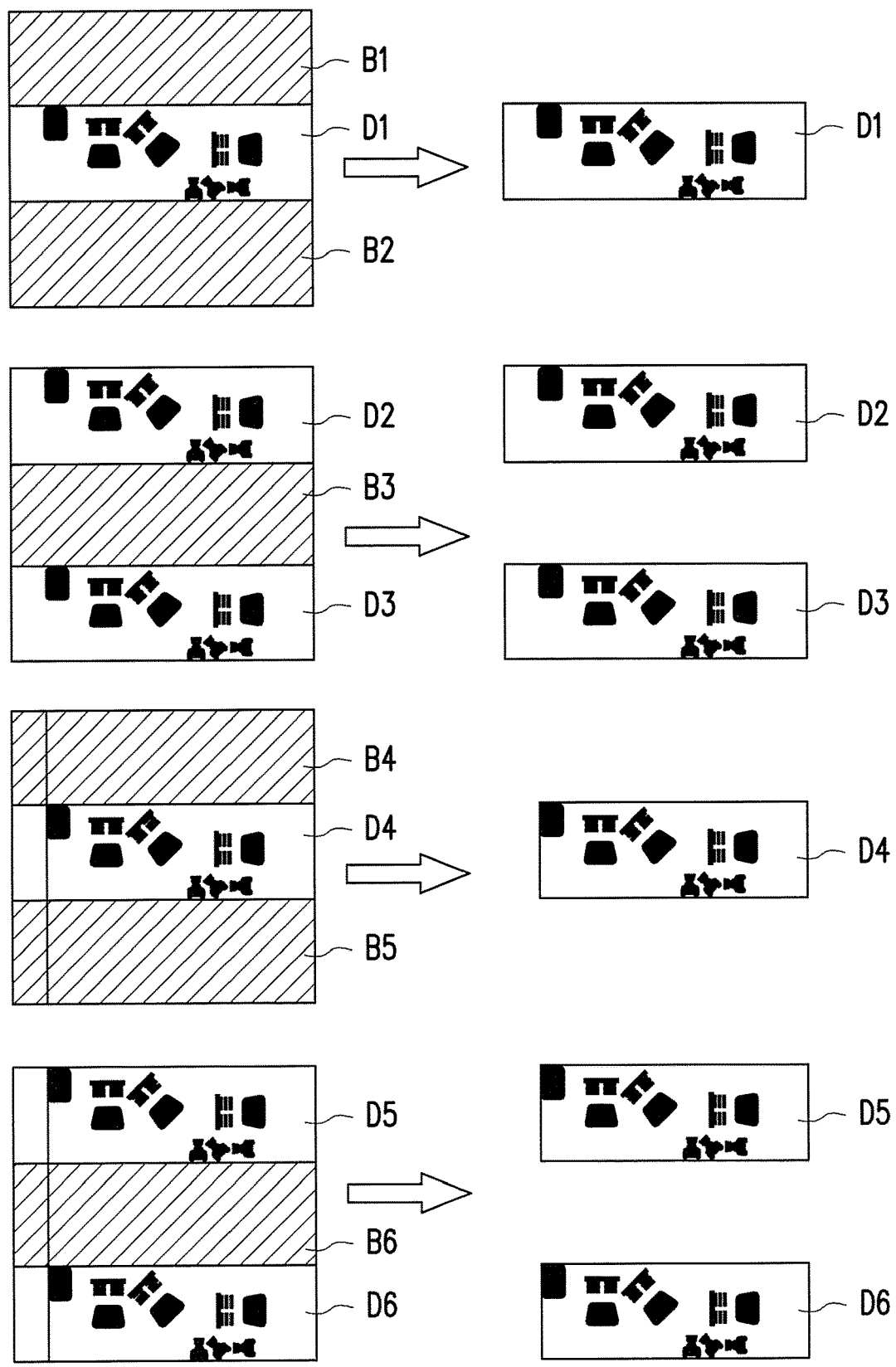
FIG. 5 is a schematic view illustrating trimming of a printing layer according to an embodiment of the disclosure.

Referring to FIG. 2, again, the trimming unit 160 is coupled to the converting unit 120 and the identifying unit 140, so to receive the printing layer FPIY. After the identifying unit 140 identifies the blank region in the printing layer FPIY, the trimming unit 160 trims off the blank region of the printing layer FPIY (Step 160). FIG. 5 is a schematic view illustrating trimming of a printing layer according to an embodiment of the disclosure. Referring to FIGS. 3-5, regarding the printing layer FPIY1, the trimming unit 160 trims off the blank regions B1 and B2. In addition, a trimmed printing layer FPIY1' keeps the data region D1. Regarding the printing layer FPIY2, the trimming unit 160 trims off the blank region B3, and a trimmed printing layer FPIY2' keeps the data regions D2 and D3. Similarly, the blank regions B4, B5, and B6 of the printing layer FPIY3 and the printing layer FPIY4 are also trimmed off by the trimming unit 160, and trimmed printing layers FPIY3' and FPIY4' only keep the data regions D4, D5, and D6.

In an embodiment of the disclosure, after trimming, the converting unit 120 receives the trimmed printing layers from the trimming unit 160, and formats the trimmed printing layers into the print head signal data. The compressing unit 180 is coupled to the converting unit 120 and the trimming unit 160, and compresses the print head signal data according to a compression standard. In this embodiment, the compression standard is a joint bi-level image group standard (JBIG standard), for example. However, the disclosure is not limited thereto. It should be noted that, when the identifying unit 140 is unable to identify a blank region on the printing layer FPIY, the trimming unit 160 does not trim the printing layer FPIY. At this time, the converting unit 120 directly converts the printing layer FPIY into the print head signal data, and the compressing unit 180 directly compresses the print head signal data. In an embodiment of the disclosure, the compressed print head signal data are stored in the storage unit of the electronic device 100. It should be noted that, since one three-dimensional structure normally corresponds to a plurality of original layers, the printing layer trimming method shown in FIG. 2 may correspond to each of the original layers and be performed repetitively until all the original layers are converted into the compressed print head signal data.

In an embodiment of the disclosure, the print head signal data is provided to the printing device 200 through the transmitting unit of the electronic device 100 to print the three-dimensional structure. More specifically, the printing head signal data and the position information of the data region on the printing layer FPIY are provided to the printing device 200 through the transmitting unit of the electronic device 100. Compared with print head signal data generated using an untrimmed printing layer FPIY, the print head signal data generated based on the trimmed printing layer FPIY are smaller in data size, and thus help improve a transmission efficiency between the electronic device 100 and the three-dimensional printing device 200.

Figure 6:
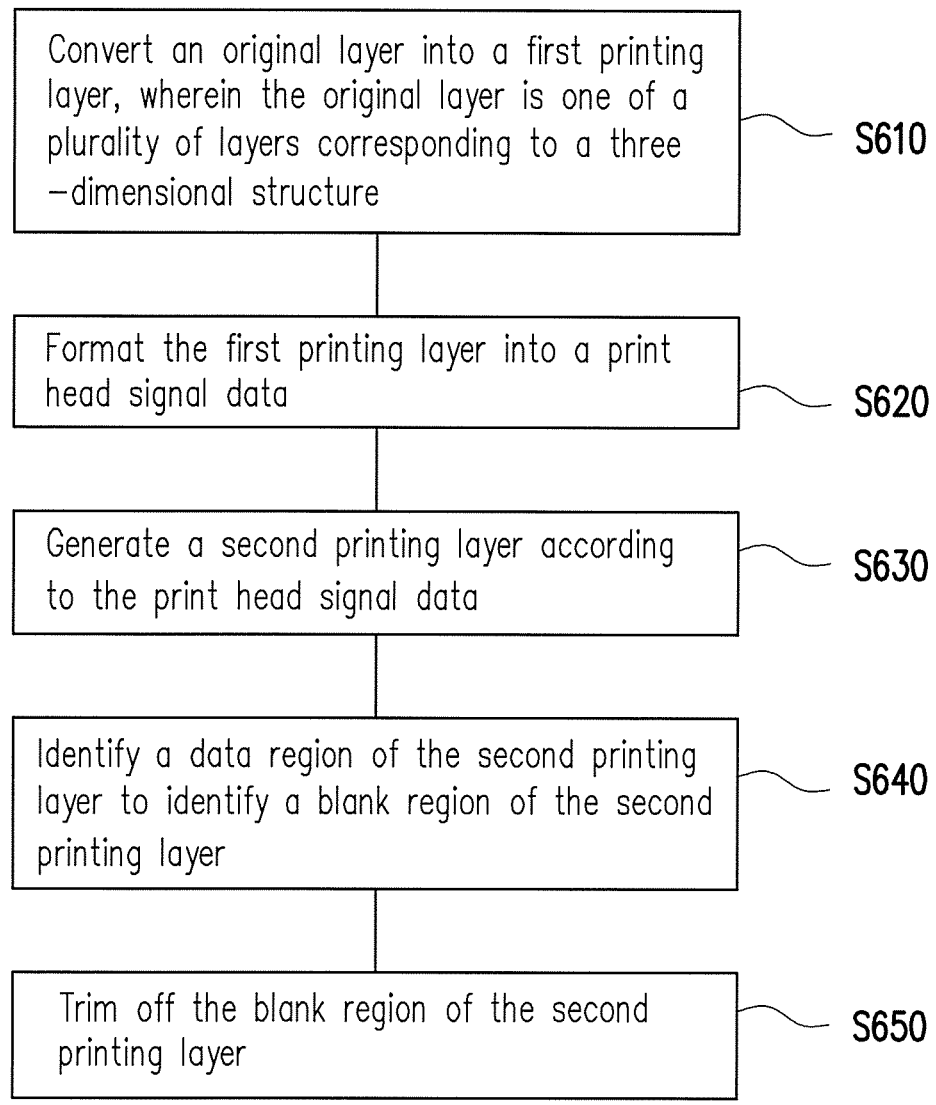
FIG. 6 is a flowchart illustrating a printing layer trimming method according to an embodiment of the disclosure.

FIG. 6 is a flowchart illustrating a printing layer trimming method according to an embodiment of the disclosure. The printing layer trimming method shown in FIG. 6 is also suitable for the electronic device 100 of FIG. 2. Referring to FIGS. 2 and 6, in this embodiment, after converting the original layer OIY into the printing layer FPIY (Step S610), the printing layer FPIY is formatted into the print head data signal (Step S620). Then, the converting unit 120 generates a printing layer SPIY according to the print head signal data (Step S630). The original layer OIY is one of the layers corresponding to the three-dimensional structure, and is a vector layer. The printing layer FPIY is in a BMP format, while the printing layer SPIY is in the PBM format.

The identifying unit 140 identifies at least one data region in the printing layer SPIY, so as to identify at least one blank region of the printing layer SPIY (Step S640). After identifying the blank region of the printing layer SPIY, the trimming unit 160 trims off the blank region of the printing layer SPIY (Step S650). Specifically, in the printing layer trimming method of this embodiment, the printing layer FPIY is not trimmed before being converted into the print head signal data. After the printing layer FPIY is converted into the print head signal data, the converting unit 120 converts the print head signal data into the printing layer SPIY, and then the blank region of the printing layer SPIY is identified and trimmed off. In this embodiment, the printing layer SPIY is in the PBM format, and a part of the three-dimensional printing device 200 may directly receive the printing layer SPIY and print the three-dimensional structure accordingly. Accordingly, the printing layer SPIY is trimmed, then compressed by the compressing unit 180 according to a compression standard (e.g., JBIG compression standard), and then directly provided to the three-dimensional printing device 200.

Details of trimming of the printing layer SPIY may be referred to the above embodiments and the corresponding FIGS. 3 to 5, and are thus not repeated in the following. Compressing and transmitting the trimmed printing layer SPIY to the printing device 200 or storing the trimmed printing layer SPIY to the storage unit may result in a preferable compression efficiency and a preferable transmission efficiency, and take up a smaller storage space.

In view of the foregoing, the printing layer trimming method and the electronic device using the same provided in the embodiments of the disclosure reduce the size of a first printing layer by trimming off a blank region of the first printing layer. The trimmed first printing layer may be converted into the print head signal data and then compressed to provide a preferable effect of compression. Also the printing layer trimming method and the electronic device using the same according to another embodiment of the disclosure may trim a second printing layer after the second printing layer is converted from a print head data signal. Thus, no matter the first printing layer, the second printing layer, or the print head signal data is stored, the consumed storage space may be significantly reduced, and a transmission efficiency of the print head signal data or the second printing layer may also be improved.

It will be apparent to those skilled in the art that various modifications and variations can be made to the structure of the disclosure without departing from the scope or spirit of the disclosure. In view of the foregoing, it is intended that the disclosure cover modifications and variations of the disclosure provided they fall within the scope of the following claims and their equivalents.

What is claimed is:

1. A three-dimensional(3D) printing data generating method, suitable for an electronic device coupled to a 3D printing device to generate a plurality of print head signal data according to a plurality of original vector layers corresponding to a plurality of cross-sections of a 3D structure, the method comprising:

converting, using a processor executing a converting program stored in a memory of the electronic device, the original vector layers into a plurality of printing image layers, wherein the original vector layers are respectively corresponding to the cross-sections of the 3D structure, and the original vector layers are image data in a scalable vector graphic format;

identifying, using the processor executing an identifying program stored in the memory, at least one data region of each of the printing image layers, identifying at least one first blank region of each of the printing image layers in a first direction and identifying at least one second blank region of each of the printing image layers in a second direction according to the identified at least one data region of each of the printing image layers, wherein the first direction is perpendicular to the second direction, wherein the at least one data region has a plurality of substantive printing portions formed by a plurality of substantive printing points, and the at least one first blank region and the at least one second blank region have no substantive printing point;

obtaining, using the processor executing a trimming program stored in the memory, a plurality of trimmed printing image layers by trimming off the at least one first blank region and the at least one second blank region from each of the printing image layers, wherein each of the trimmed printing image layers only have the at least one data region; and generating, using the processor executing the converting program stored in the memory, the print head signal data by the trimmed printing image layers, wherein the print head signal data of the trimmed printing image layers is readable by the 3D printing device, and the print head signal data of the trimmed printing image layers is provided to the 3D printing device, wherein the 3D printing device forms a plurality of physical layers in shapes corresponding to the cross-sections of the 3D structure one by one according to the print head signal data of the trimmed printing image layers, so as to 3D-print the whole 3D structure by all the formed physical layers without physically trimming the formed physical layers, wherein the size of the trimmed printing image layers is smaller than the size of the printing image layers, and the size of the print head signal data generated by the trimmed first printing image layer is smaller than another print head signal data generated by the printing image layers not being trimmed off, such that the time used for generating the print head signal data of the trimmed printing image layers and the space required for storing the print head signal data of the trimmed printing image layers are decreased.

2. The 3D printing data generating method as claimed in claim 1, wherein the step of identifying, using the processor executing an identifying program stored in the memory, at least one data region of each of the printing image layers, identifying at least one first blank region of each of the printing image layers in a first direction and identifying at least one second blank region of each of the printing image layers in a second direction according to the identified at least one data region of each of the printing image layers comprises:

identifying, using the processor executing the identifying program stored in the memory, a first starting point position and a first end point position of each of the data region of each of the printing image layers in the first direction;

identifying, using the processor executing the identifying program stored in the memory, a second starting point position and a second end point position of each of the data region of each of the printing image layers in the second direction;

identifying, using the processor executing the identifying program stored in the memory, the at least one first blank region of each of the printing image layers according to the first starting point position and the first end point position of each of the data region; and identifying, using the processor executing the identifying program stored in the memory, the at least one second blank region of each of the printing image layers according to the second starting point position and the second end point position of each of the data region.

3. The 3D printing data generating method as claimed in claim 1, further comprising:

compressing, using the processor executing a compressing program stored in the memory, the trimmed printing image layers according to a compression standard, wherein the compressed and trimmed printing image layers are provided to the 3D printing device to print the 3D structure.

* * * * *